United States Patent [19]
Draaisma

[11] Patent Number: 5,398,146
[45] Date of Patent: Mar. 14, 1995

[54] RESET CASSETTE WITH ELECTROMAGNETIC MEANS FOR RESTORING THE DESIRED MAGNETIZATION DIRECTION IN A MAGNETIORESISTIVE HEAD OF A SYSTEM FOR RECORDING AND/OR REPRODUCING SIGNALS

[75] Inventor: Eeltje A. Draaisma, Eindhoven, Netherlands

[73] Assignee: U.S. Philips Corporation, New York, N.Y.

[21] Appl. No.: 240,193

[22] Filed: May 9, 1994

Related U.S. Application Data

[63] Continuation of Ser. No. 38,574, Mar. 26, 1993, abandoned.

[30] Foreign Application Priority Data

May 26, 1992 [EP] European Pat. Off. ............ 92201499

[51] Int. Cl.⁶ .......................... G11B 5/465; G11B 5/33
[52] U.S. Cl. ..................................... 360/128; 360/113
[58] Field of Search ................................ 360/128, 113

[56] References Cited
U.S. PATENT DOCUMENTS

| | | | |
|---|---|---|---|
| 4,052,748 | 10/1977 | Kuijk | 360/113 |
| 4,135,219 | 1/1979 | Yoshizawa et al. | 360/128 |
| 4,224,649 | 9/1980 | Alexandrovich, Sr. | 360/128 |

FOREIGN PATENT DOCUMENTS
0406943 6/1990 European Pat. Off. .

OTHER PUBLICATIONS
Funkschau, No. 9, Apr. 16, 1992, pp. 30–39.

*Primary Examiner*—Aristotelis Psitos
*Assistant Examiner*—James L. Habermehl
*Attorney, Agent, or Firm*—Brian J. Wieghaus

[57] ABSTRACT

A system for recording and/or reproducing signals on a magnetic medium. The system comprises a tape cassette provided with a magnetic tape and an apparatus for cooperation with the tape cassette. The apparatus has a magnetic head comprising at least one magnetoresistive element having an easy axis of magnetization and a defined direction of magnetization extending at least substantially parallel to said axis. The system further comprises a reset cassette which can be loaded into the apparatus and which comprises a housing with a central opening for the passage of the magnetic tape and electronic means, arranged in the housing, for generating a non-alternating magnetic field at the location of the magnetic head when the reset cassette is present in the apparatus, which field has a direction similar to the defined direction of magnetization of the magnetoresistive element.

36 Claims, 3 Drawing Sheets

RESET CASSETTE WITH ELECTROMAGNETIC MEANS FOR RESTORING THE DESIRED MAGNETIZATION DIRECTION IN A MAGNETIORESISTIVE HEAD OF A SYSTEM FOR RECORDING AND/OR REPRODUCING SIGNALS

This is a continuation of application Ser. No. 08/038,574, filed on Mar. 26, 1993 and now abandoned.

BACKGROUND OF THE INVENTION

The invention relates to a system for recording and/or reproducing signals on a magnetic medium, the system comprising a tape cassette provided with a magnetic tape and an apparatus for cooperation with the tape cassette, which apparatus has a magnetic head comprising at least one magnetoresistive element having an easy axis of magnetisation and a defined direction of magnetisation extending at least substantially parallel to said axis.

Such a system is known from EP-A-0,406,943 (which corresponds to U.S. Ser. No. 059,720 filed May 10, 1993; herewith incorporated by reference).

The known system, which employs magnetic-tape cassettes for recording digital audio signals, is now generally referred to as the DCC (Digital Compact Cassette) system. A DCC tape cassette comprises a housing having two plane-parallel main walls interconnected by transverse walls, one of which constitutes a cassette front wall with a central opening. The housing accommodates two reels with a magnetic tape extending along the central opening. The DCC tape cassette further comprises a sliding cover which is movable between a closed position and an open position and which closes the central opening in the closed position and exposes said opening in the open position.

The known system includes apparatuses suitable for cooperation with DCC tape cassettes. Such an apparatus has a magnetic head suitable for recording and/or reading information in digital form in longitudinal tracks on a magnetic tape. Recording and reading information in digital form has many advantages; for example, the signal is not afflicted with tape noise. Moreover, the frequency range is larger than in the case that information is recorded on and/or read from a magnetic tape in analog form, which results in the signal itself being also improved. The magnetic head used has a head face for the longitudinal guidance of a magnetic tape and has a read section for reading the information from the magnetic tape. For reading the information, which is present on the magnetic tape in a plurality of tracks and with different wavelengths, the read section comprises a plurality of magnetoresistive elements. The magnetic head is preferably constructed as a thin-film magnetic head and is shown, for example, in the magazine Funkschau, no. 9, Apr. 16, 1992, pp. 30–39 (herewith incorporated by reference). The magnetoresistive elements may be of a type as described in U.S. Pat. No. 4,052,748 (herewith incorporated by reference).

Each magnetoresistive element has an elongate active part of a magnetically anisotropic material, whose ends can be connected to a current or voltage source. The magnetoresistive element has an easy axis of magnetisation which coincides or substantially coincides with the longitudinal axis of said part and one defined direction of magnetisation which extends at least substantially parallel to the easy axis of magnetisation. For a correct operation of the magnetic head, in particular in the read mode, it is essential that the magnetisation in the defined direction is maintained. However, it has been found that the magnetisation thus established may be disturbed as a result of external influences, such as for example the presence of an external magnetic field or the temporary exposure to high temperatures, which may lead to a deterioration of the performance of the magnetic head.

SUMMARY OF THE INVENTION

It is an object of the invention to provide steps to restore, if necessary, the desired direction of magnetisation of the magnetoresistive element of the magnetic head of the apparatus of the system defined in the opening paragraph.

The system in accordance with the invention is characterised in that the system comprises a reset cassette which can be loaded into the apparatus and which comprises a housing having an opening for the passage of the magnetic head and electromagnetic means, accommodated in the housing, for generating a non-alternating magnetic field at the location of the magnetic head when the reset cassette is present in the apparatus, which field has a direction at least substantially similar to the defined direction of magnetisation of the magnetoresistive element.

In the system in accordance with the invention the magnetic head moves past said opening in the housing while the reset cassette is transferred to its end position in the apparatus. After this, said non-alternating magnetic field (or direct magnetic field) may be generated. It has been found that a brief direct magnetic field of satisfactory strength, for example 500 Gauss, is adequate in order to restore the desired direction of magnetisation of a disturbed magnetoresistive element.

An embodiment of the system in accordance with the invention is characterised in that the electromagnetic means comprise an electric circuit comprising a current source, at least one electrical coil, and a switching unit. The electrical coil can be energized, for example, with a current pulse of rectangular shape for a time interval of one second. The profile of the magnetic field thus generated is then also substantially rectangular.

An embodiment of the system in accordance with the invention is characterised in that the reset cassette comprises a magnetic yoke which traverses the electrical coil and which has two limbs between which a space for receiving the magnetic head is formed. Near their free ends the limbs have facing polepieces between which the magnetic head is engageable. In this practical embodiment the magnetic yoke provides an at least approximately homogeneous magnetic field between the two polepieces.

An embodiment of the system in accordance with the invention, in which the apparatus comprises a movable member which, when the tape cassette is present in the apparatus, cooperates with the magnetic tape in a play mode of the apparatus, is characterised in that the movable member actuates a switch of the switching unit when the reset cassette is present in the apparatus in the play mode of the apparatus. The movable member can be a pressure roller which presses the magnetic tape against a capstan of the apparatus in a play mode of the apparatus if the tape cassette is present in the apparatus.

An embodiment of the system in accordance with the invention, in which the magnetic head of the apparatus is pivotable between a first operating position and a second operating position pivoted through 180° relative to said first operating position, is characterised in that there are provided actuating means for actuating the switching unit depending on the operating position occupied by the magnetic head when the reset cassette is present in the apparatus. This embodiment is of particular importance if the apparatus has an auto-reverse function. In such an apparatus, if a tape cassette is present in the apparatus, the transport direction of the magnetic tape is automatically reversed at the end of the tape and, in addition, the magnetic head is pivoted through 180°. Said actuating means preclude a remagnetisation in a wrong direction relative to the magnetic head.

An embodiment of the system in accordance with the invention, in which the apparatus comprises a movable member at both sides of the magnetic head and, when the tape cassette is present in the apparatus, a first movable member cooperates with the magnetic tape in a play mode of the apparatus in which the magnetic head is in the first operating position, and a second movable member cooperates with the magnetic tape in a play mode of the apparatus in which the magnetic head is in the second operating position, is characterised in that the actuating means comprise at least one of the movable members which, when a reset cassette is present in the apparatus, actuates a switch of the switching unit in the relevant play mode of the apparatus. The movable members can be pressure rollers intended for pressing the magnetic tape of a tape cassette against a capstan of the apparatus in a play mode of the apparatus. Depending on the position of the magnetic head either the one or the other pressure roller will be moved towards a capstan when the play mode of the apparatus is started. Thus, if a reset cassette is present in the apparatus, the operating position of the magnetic head can be derived from the movement of one or both pressure rollers.

An embodiment of the system in accordance with the invention, in which the apparatus comprises two spindles for cooperation with two reels of the tape cassette, is characterised in that the actuating means comprise a sensor arranged in the reset cassette for detecting the driving spindle and hence the operating position occupied by the magnetic head when the reset cassette is present in the apparatus in a play mode of the apparatus.

An embodiment of the system in accordance with the invention is characterised in that the actuating means comprise a control unit arranged in the reset cassette for feeding an electric current through the electrical coil of the electric circuit depending on the operating position of the magnetic head when the reset cassette is present in the apparatus. In this embodiment the direction of the current through the electrical coil is a function of the detected actual operating position of the magnetic head.

The invention further relates to a reset cassette belonging to the system in accordance with the invention and, consequently, suitable for use in the system. The reset cassette in accordance with the invention is characterised in that the reset cassette has a housing comprising two at least substantially parallel main walls and a plurality of transverse walls interconnecting the main walls, one of said transverse walls having an opening, and electromagnetic means arranged in the housing for generating in the reset cassette near the opening a non-alternating magnetic field directed from one of the main walls towards the other main wall. The reset cassette in accordance with the invention enables a destabilised magnetoresistive element of a magnetic head of an apparatus of the system in accordance with the invention to be stabilised.

A simple and practical embodiment of the reset cassette in accordance with the invention is characterised in that the electromagnetic means comprise an electric circuit comprising a switch, an electrical coil and a voltage-source connection. The voltage source can be a removable rechargeable or non-rechargeable battery. Alternatively, the reset cassette may be provided with an rechargeable internal storage battery.

An embodiment of the reset cassette in accordance with the invention is characterised in that the electromagnetic means comprise a magnetic yoke traversing the electrical coil and having two limbs extending parallel to the main walls, which limbs have spaced apart free ends near the opening of the reset cassette. The free ends form facing magnetic polefaces between which a magnetic head built into an apparatus and comprising at least one magnetoresistive element is engageable. In this embodiment the desired magnetic field can be generated with a comparatively small e.m.f.

An embodiment of the reset cassette in accordance with the invention is characterised in that the electric circuit comprises a capacitor arranged electrically in parallel with the coil. This embodiment enables a brief and strong magnetic field to be realised.

The reset cassette in accordance with the invention may have a housing which is at least substantially similar to that of the standard tape cassette of the system. Intended here is in particular the DCC tape cassette. The reset cassette may also have a housing which is at least substantially similar to the standard Compact Cassette. In both cases the reset cassette has external dimensions which are equal or substantially equal to the external dimensions of the tape cassette. This ensures that the reset cassette is accepted by all the recording and/or reproducing apparatuses and storage devices belonging to the standard DCC system. A label or an externally visible insert enables the reset cassette to be distinguished from the tape cassette.

BRIEF DESCRIPTION OF THE DRAWINGS

The invention will now be described in more detail, by way of example, with reference to the drawings, in which.

DESCRIPTION OF THE PREFERRED EMBODIMENTS

Figure 1:
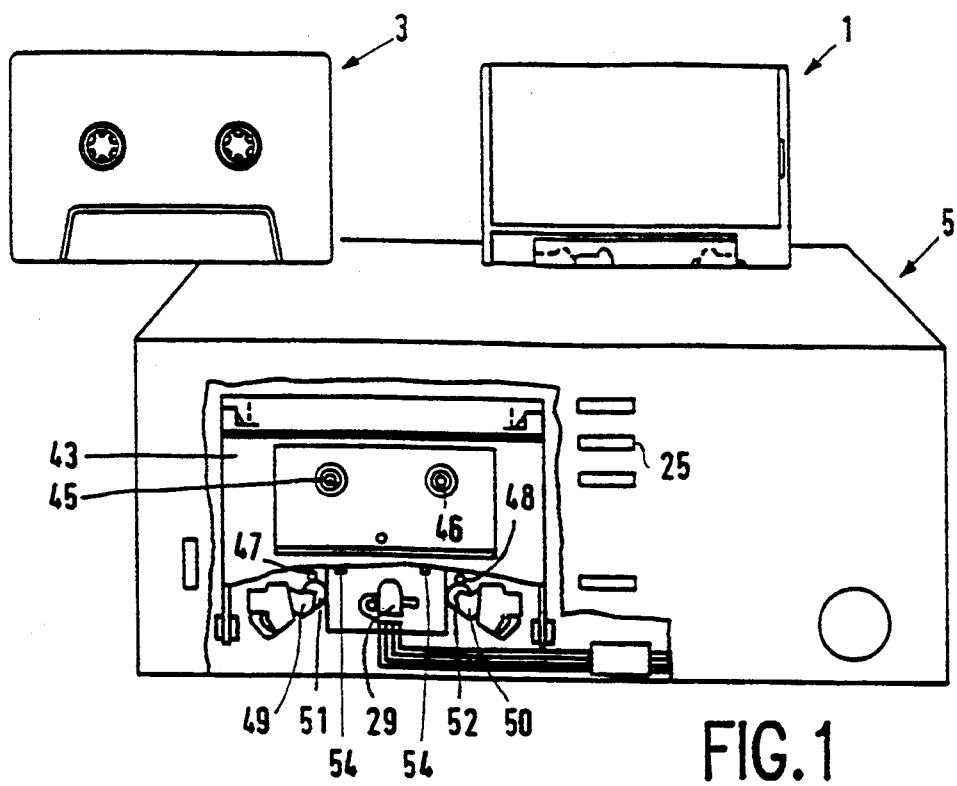
FIG. 1 shows an embodiment of the system, comprising a magnetic-tape apparatus with a magnetic-head unit, a tape cassette, and an embodiment of the reset cassette in accordance with the invention.
Figure 2:
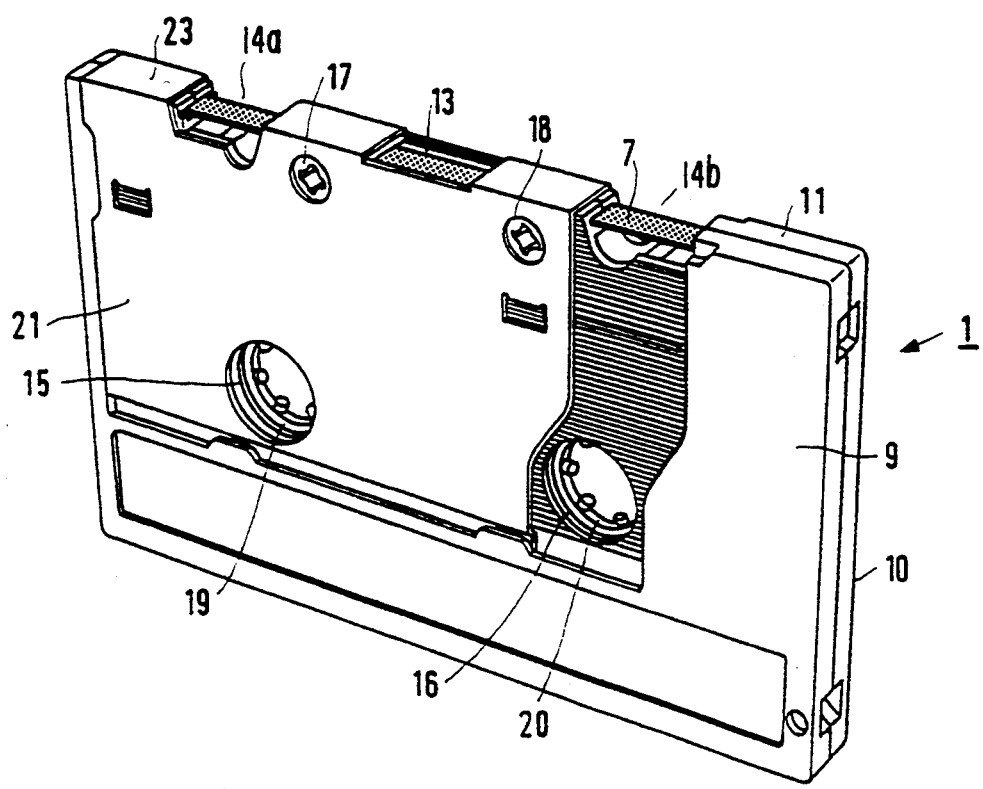
FIG. 2 is a perspective view of the tape cassette.

FIG. 1 shows a tape cassette 1, a reset cassette 3 and a magnetic-tape apparatus 5 of an embodiment of the system in accordance with the invention for recording and reproducing audio signals on/from magnetic tape. The tape cassette 1, which is shown to an enlarged scale in FIG. 2, is a so-called "Digital Compact Cassette" and accommodates a magnetic tape 7, for example a chromium dioxide tape. The magnetic tape may be prerecorded (prerecorded cassette) or may be blank (blank cassette). In the prerecorded cassette the information is recorded on the magnetic tape in a plurality of parallel tracks.

The shown tape cassette 1 has two main walls 9 and 10 and four transverse walls including a cassette front wall 11. The cassette front wall 11 has a central opening 13 and two side openings 14a and 16 situated one on each side of said central opening. The main walls 9 and 10 have drive apertures 15 and 16 and locating apertures 17 and 18. Between the two main walls 9 and 10 two reels 19 and 20 are arranged, to which the magnetic tape 7 is attached. During tape transport the magnetic tape 7 is wound from one of the reels, is guided past the cassette front wall 11 and is subsequently wound onto the other reel. To preclude damaging and soiling of the magnetic tape 7 in the tape cassette 1 the tape cassette 1 is provided with a sliding cover 21 by means of which the openings in the walls of the tape cassette can be closed. The sliding cover 21 comprises two plate-shaped portions 21 overlying the main walls 9 and 10 and a connecting portion 23 extending along the cassette front wall 11.

The shown magnetic-tape apparatus 5 comprises a number of controls 25 for starting and stopping various functions of the apparatus, such as for example the recording function and the reproducing function. The apparatus 5 comprises a magnetic-head unit 27, which is shown to an enlarged scale in FIG. 3 and which comprises a multi-track magnetic head 29 and a magnetic-head housing 31 having guide means 31a for guiding the magnetic tape past a head face 33. The magnetic head 29 used in the apparatus 5 is suitable for reading and writing information in digital form and for reading information in analog form. For this purpose, the magnetic head 29 has a first pattern of read gaps R-d for reading and write gaps W-d for writing information in digital form and a second pattern of read gaps R-a for reading information in analog form. For the purpose of writing, the magnetic head 29 comprises write coils, not shown. The magnetic tape 7 is read by means of magnetoresistive elements in the magnetic head 7.

Figure 4:
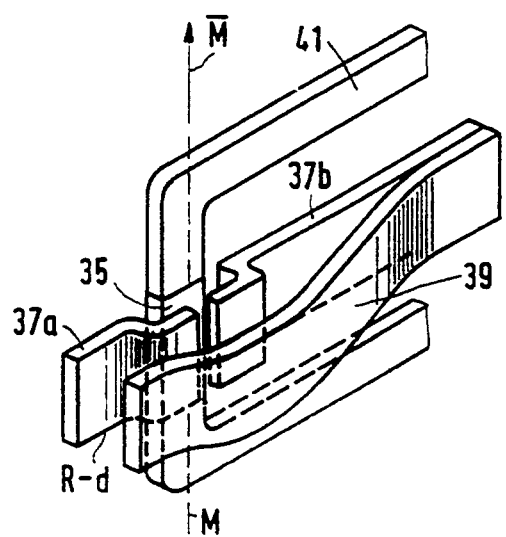
FIG. 4 shows a part of the magnetic head.

FIG. 4 shows an example of a magnetoresistive element or MR element 35 provided in the magnetic head 29. The MR element 35 forms part of a magnetic yoke, which further comprises a two-part first flux guide 37a, 37b and a second flux guide 39, the MR element 35 magnetically shunting the opening between the flux-guide parts 37a and 37b. One of the read gaps R-d or R-a, in the present example a read gap R-d, is situated between the flux-guide part 37a and the second flux guide 39. As is assumed to be known, the electrical resistance of an MR element varies as a function of an applied alternating magnetic field. In the present system this is the magnetic field produced by the magnetic tape moving past the head face 33, which field is guided to the MR elements. In operation a constant measurement current is fed through each MR element 35 by means of an electrically conductive strip 41 in order to enable the voltage variations across the relevant MR element, which are related to the resistance variations, to be measured.

Figure 3:
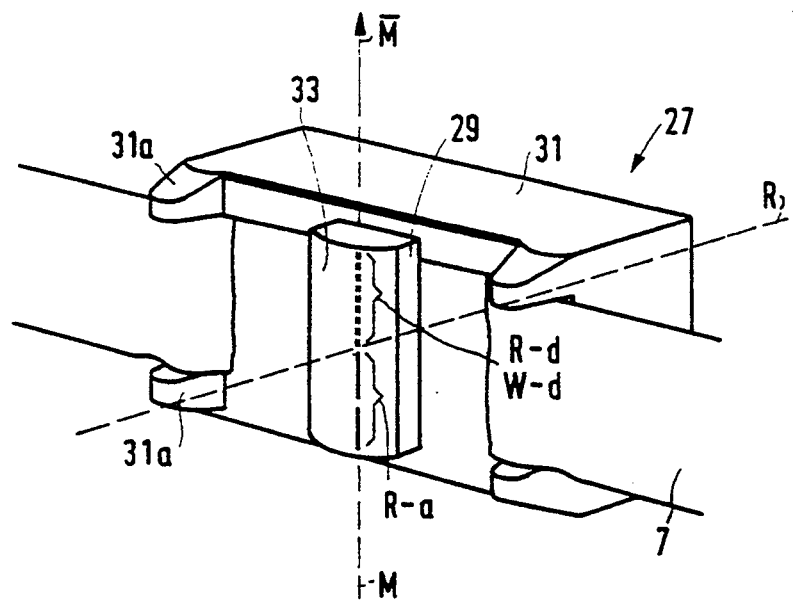
FIG. 3 is a perspective view showing the magnetic-head unit comprising a multi-track magnetic head.

Each MR element 35 has an easy axis of magnetisation, indicated by the letter M in FIGS. 3 and 4. Moreover, the MR elements 35 all have a similar defined direction of magnetisation, represented by the vector M.

For loading the tape cassette 1 into the apparatus 5 the apparatus 5 comprises a loading mechanism 43 in the form of a pivotable cassette holder. The apparatus 5 further comprises two spindles or drive shafts 45 and 46 for cooperation with the reels 19 and 20 of the tape cassette 1. For the transport of the magnetic tape 7 of the tape cassette 1 loaded into the apparatus 5 past the magnetic head 29, the apparatus 5 has a transport device comprising two capstans 47 and 48 and two movable, in particular rotatable, members 49 and 50 with pressure rollers 51 and 52. For a correct cooperation of the tape cassette with the magnetic-tape apparatus the apparatus 5 comprises locating pins 54 for cooperation with the locating apertures 17 and 18 of the tape cassette 1.

During use of the magnetic-tape apparatus, for example in the play mode, the magnetic-head unit 27 engages the central opening 13 of the tape cassette 1, the magnetic tape 7 being guided past the head face 33 of the magnetic head 31 by the tape-guide means 31a. The magnetic-tape apparatus shown is a so-called auto-reverse apparatus in which the direction of transport of the magnetic tape is reversed automatically when the end of the tape is reached. For this purpose, as already stated, the apparatus comprises two capstans and two pressure rollers, one capstan with associated pressure roller being used in one transport direction of the magnetic tape and the other capstan with associated pressure roller being used in the other transport direction. Depending on the tape transport direction, the movable member 49 or 50 engages one of the side openings of the tape cassette 1, the pressure roller arranged on the relevant member cooperating with the facing capstan.

In order to enable information to be written on or read from the magnetic tape in both directions of tape transport, the magnetic-head unit 31 is arranged in the apparatus 1 so as to be pivotable about a pivotal axis R, see FIG. 3, through an angle of 180°. For this purpose, the apparatus 5 comprises a pivoting device, which also ensures that in each tape transport direction the magnetic head 29 occupies the correct position and that the appropriate capstan and the appropriate movable member with pressure roller are activated.

For a further description of the DCC system reference is made to, for example, the afore-mentioned magazine Funkschau, no. 9, Apr. 16, 1992, pp. 30–39.

Figure 5:
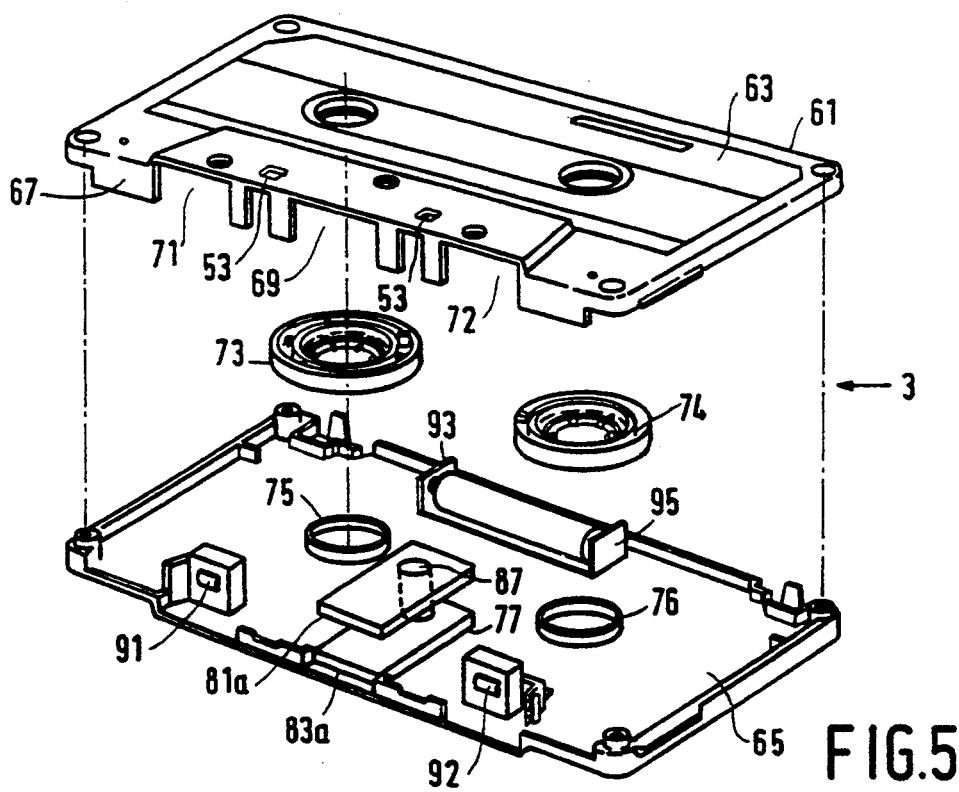
FIG. 5 is an exploded view of the reset cassette.

The embodiment of the reset cassette 3 in accordance with the invention shown in FIG. 5 has a housing 61 comprising two plane-parallel main walls 63 and 65 interconnected by transverse walls, one of which constitutes a cassette front wall 67. The reset cassette 3 fits into the cassette holder 43 of the apparatus 5 and for this purpose it exhibits a number of characteristic features similar to those of the tape cassette 1 described hereinbefore.

The cassette front wall 67 of the reset cassette 3 has a central opening 69 for the passage of the magnetic head 29 of the apparatus 5 and, situated one on each side thereof, two side openings 71 and 72 for the passage of the movable members 49 and 50 carrying the pressure rollers 50 and 52 of the apparatus 5. For the passage of the spindles 45 and 46 the main walls 53 and 65 have apertures 75 and 76. The main walls further have locating apertures 53 for cooperation with the locating pins 54 of the apparatus 5.

Figure 6:
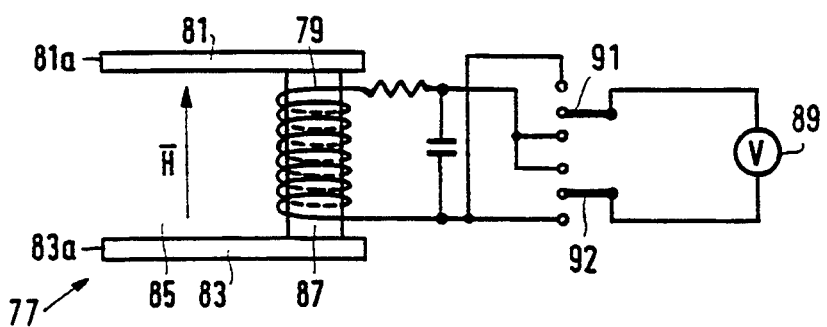
FIG. 6 shows diagrammatically electromagnetic means of the reset cassette.

Near the central opening 69 the housing 61 of the reset cassette 3 accommodates a magnetic yoke 77 with an electrical coil 79, see also FIG. 6. The magnetic yoke comprises two plates or limbs 81 and 83 which extend parallel to the main walls 63 and 65 of the housing and have free ends 81a and 83a facing the central opening 69. The limbs 81 and 83 bound a space 85 of such dimensions that it can receive the magnetic head 29. The magnetic yoke 77 further comprises a core 87 which traverses the electrical coil 79 and interconnects the two limbs 81 and 83. The coil 79 forms part of an electric circuit provided inside the housing 61 and further comprising a voltage source 89 and a switching unit with two switches 91 and 92. The voltage source 89 can be a battery 93 placed in a holder 95 provided in the housing 61. The switches 91 and 92 are situated near the respective side opening 71 or 72 and are arranged in such a way that they can be actuated by the movable member 49 or 50 of the apparatus 5. The switches may comprise two interlocked three-position switches.

If the reset cassette 3 has been inserted into the apparatus 5 the apparatus can be set to the play position by means of the controls 25 in a customary manner. In a customary manner one of the two movable members 49 or 50 engages the cassette via the side opening 71 or 72, depending on the instantaneous position of the magnetic head 29, as a result of which one of the switches 91 or 92 is actuated.

The two switches 91 and 92 are normally in a neutral position, as is shown in FIG. 6. If one of the two switches is activated the electric circuit is closed, causing a non-alternating magnetic field H to be generated briefly in the space 85 of the magnetic yoke 77. The vector H, which is oriented transversely of the main walls 63 and 65 of the reset cassette, has a direction similar or at least substantially similar to the defined direction of magnetisation M of the magnetoresistive elements 35 of the magnetic head 29.

By means of the magnetic pulse thus generated, deranged or destabilised MR elements can be reconditioned. Owing to the special construction of the reset cassette and the given relation existing in the apparatus between the position of the magnetic head 29 and the movable member 49 or 50 to be activated and carrying the respective pressure roller 51 or 52 the correct direction of the vector H relative to the magnetic head engaging the reset cassette is always guaranteed.

The electric circuit shown in FIG. 6 may comprise a capacitor arranged electrically in parallel with the coil. Moreover, a series resistor may be interposed between the capacitor and the coil.

It is to be noted that instead of two switches the reset cassette shown in FIG. 5 may comprise only one switch, if the reset cassette is used in magnetic-tape apparatuses comprising a non-pivotable magnetic head. Moreover, one switch is adequate if in an auto-reverse deck the actual position of the magnetic head is detected and the position of the reset cassette is adapted thereto.

Figure 7:
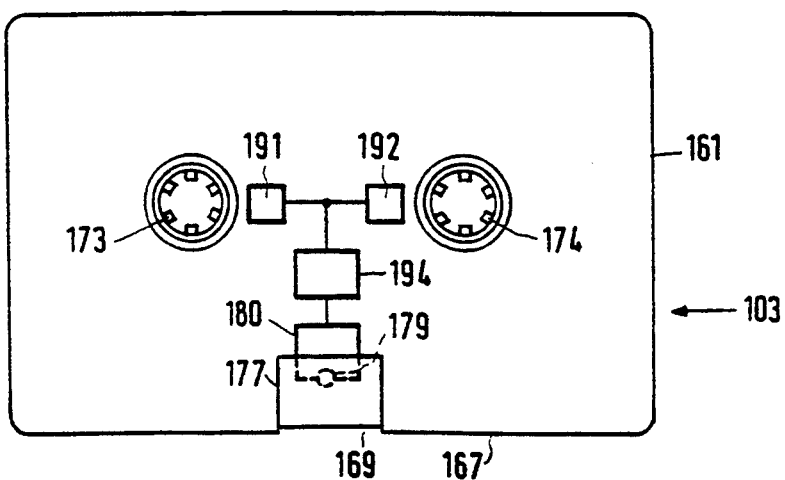
FIG. 7 shows diagrammatically another embodiment of the reset cassette.

It is to be noted also that instead of one or more switches which can be actuated by a member of the magnetic-tape apparatus, the reset cassette in accordance with the invention may comprise a sensor for detecting the driving spindle in the play mode of the apparatus when the apparatus contains a reset cassette. FIG. 7 shows diagrammatically an embodiment comprising such a sensor. The shown reset cassette 103 has a housing 161 which as regards its shape and dimensions corresponds to the housing 61 of the reset cassette 3. The housing 161 accommodates two reels 173 and 174 for cooperation with the drive spindles of the magnetic-tape apparatus shown in FIG. 1 or a similar apparatus. The housing 161, which has a central opening 169 in a cassette front wall 167, further accommodates a magnetic yoke 177 with an electrical coil 179 for generating a pulse-shaped non-alternating magnetic field whose field vector is oriented transversely of the main walls of the reset cassette. The coil 179 forms part of an electric circuit 180 which also includes a voltage source. Near the reels 173 and 174 a sensor 191, 192 is arranged, for example an optical sensor, for detecting the driving spindle in the play mode of a magnetic-tape apparatus when the magnetic-tape apparatus contains a reset cassette 103. The output signal of the sensor 191, 192 is applied to an electronic control unit 194 accommodated in the housing 103. Since in the magnetic-tape apparatus, which is known per se, a given relation exists between the position of the magnetic head and the spindle being driven the control unit 194 is capable in every situation of deriving from the output signal of the sensor 191, 192 the direction of the current through the coil 179 for which the generated magnetic field has the required direction. This ensures that the generated magnetic field has a direction corresponding to the defined direction of magnetisation M of a magnetic head comprising MR elements and situated in the reset cassette 103.

It is to be noted that the invention is not limited to the embodiments shown herein. For example, differently constructed electric circuits are possible within the scope of the invention.

I claim:

1. A system for recording and/or reproducing signals on a magnetic medium, the system comprising:
    a tape cassette including a magnetic tape;
    and an apparatus for cooperation with the tape cassette, which apparatus has a magnetic head comprising at least one magnetoresistive element having an easy axis of magnetisation and a defined direction of magnetisation extending at least substantially parallel to said axis; and
    a reset cassette loadable into the apparatus and which comprises a housing having an opening for the passage of the magnetic head and electromagnetic means, accommodated in the housing, for generating a non-alternating magnetic field at the location of the magnetic head when the reset cassette is loaded in the apparatus, which field has a direction at least substantially similar to the defined direction of magnetisation of the magnetoresistive element.

2. A system as claimed in claim 1, characterised in that the electromagnetic means comprise an electric circuit comprising a current source, an electrical coil, and a switching unit.

3. A system as claimed in claim 2, characterised in that the reset cassette comprises a magnetic yoke which traverses the electrical coil and which has two limbs between which a space for receiving the magnetic head is formed.

4. A system as claimed in claim 3, wherein the apparatus comprises a movable member which, when the tape cassette is loaded in the apparatus, cooperates with the magnetic tape in a play mode of the apparatus, and wherein the switching unit includes a switch activatable by the movable member when the reset cassette is present in the apparatus in the play mode of the apparatus.

5. A system as claimed in claim 3, wherein the magnetic head of the apparatus is pivotable between a first operating position and a second operating position pivoted through 180° relative to said first operating position, and the system further comprises actuating means for actuating the switching unit depending on the operating position occupied by the magnetic head when the reset cassette is present in the apparatus.

6. A system as claimed in claim 5, wherein the apparatus comprises a movable member at both sides of the magnetic head and, when the tape cassette is present in the apparatus, a first movable member cooperates with the magnetic tape in the play mode of the apparatus in which the magnetic head is in the first operating position, and a second movable member cooperates with the magnetic tape in a play mode of the apparatus in which the magnetic head is in the second operating position, and the actuating means comprises a said movable member which, when a reset cassette is loaded in the apparatus, actuates said switch of the switching unit in the relevant play mode of the apparatus.

7. A system as claimed in claim 6, wherein the actuating means comprises a control unit arranged in the reset cassette for feeding an electric current through the electrical coil of the electric circuit depending on the operating position of the magnetic head when the reset cassette is present in the apparatus.

8. A system as claimed in claim 5, wherein the tape cassette of the system includes two reels, the apparatus comprises two spindles for cooperation with the two reels of the tape cassette, and the actuating means comprises a sensor arranged in the reset cassette for detecting rotation of the driving spindle and hence the operating position occupied by the magnetic head when the reset cassette is present in the apparatus in a play mode of the apparatus.

9. A system as claimed in claim 8, characterised in that the actuating means comprise a control unit arranged in the reset cassette for feeding an electric current through the electrical coil of the electric circuit depending on the operating position of the magnetic head when the reset cassette is present in the apparatus.

10. A system as claimed in claim 5, characterised in that the actuating means comprise a control unit arranged in the reset cassette for feeding an electric current through the electrical coil of the electric circuit depending on the operating position of the magnetic head when the reset cassette is present in the apparatus.

11. A system as claimed in claim 2, wherein the apparatus comprises a movable member which, when the tape cassette is present in the apparatus, cooperates with the magnetic tape in a play mode of the apparatus, and wherein the switching unit includes a switch activatable by the movable member when the reset cassette is present in the apparatus in the play mode of the apparatus.

12. A system as claimed in claim 2, wherein the magnetic head of the apparatus is pivotable between a first operating position and a second operating position pivoted through 180° relative to said first operating position, and the system further comprises actuating means for actuating the switching unit depending on the operating position occupied by the magnetic head when the reset cassette is present in the apparatus.

13. A system as claimed in claim 12, wherein the apparatus comprises a movable member at both sides of the magnetic head and, when the tape cassette is present in the apparatus, a first movable member cooperates with the magnetic tape in a play mode of the apparatus in which the magnetic head is in the first operating position, and a second movable member cooperates with the magnetic tape in a play mode of the apparatus in which the magnetic head is in the second operating position, the actuating means comprises a one said movable members which, when a reset cassette is loaded in the apparatus, actuates a switch of the switching unit in the relevant play mode of the apparatus.

14. A system as claimed in claim 13, wherein the actuating means comprise a control unit arranged in the reset cassette for feeding an electric current through the electrical coil of the electric circuit depending on the operating position of the magnetic head when the reset cassette is present in the apparatus.

15. A system as claimed in claim 12, in which the apparatus comprises two spindles for cooperation with two reels of the tape cassette, and the actuating means rotation comprises a sensor arranged in the reset cassette for detecting the driving spindles and hence the operating position occupied by the magnetic head when the reset cassette is present in the apparatus in a play mode of the apparatus.

16. A system as claimed in claim 15, wherein the actuating means comprises a control unit arranged in the reset cassette for feeding an electric current through the electrical coil of the electric circuit depending on the operating position of the magnetic head when the reset cassette is present in the apparatus.

17. A reset cassette comprising a housing comprising two at least substantially parallel main walls and a plurality of transverse walls interconnecting the main walls, one of said transverse walls having an opening, and electromagnetic means arranged in the housing for generating in the reset cassette near the opening a non-alternating magnetic field directed from one of the main walls towards the other main wall.

18. A reset cassette as claimed in claim 17, characterised in that the electromagnetic means comprise an electric circuit comprising a switch, an electrical coil and a power-source connection.

19. A reset cassette as claimed in claim 18, characterised in that the electromagnetic means comprise a magnetic yoke traversing the electrical coil and having two limbs extending parallel to the main walls, which limbs have spaced apart free ends near the opening of the reset cassette.

20. A reset cassette as claimed in claim 19, characterised in that the electric circuit comprises a capacitor arranged electrically in parallel with the coil.

21. A reset cassette as claimed in claim 20, characterised in that a resistor is interposed in series between the capacitor and the coil in the electric circuit.

22. A reset cassette as claimed in claim 21, characterised in that the reset cassette has external dimensions substantially equal to the external dimensions of one of a DCC tape cassette and a Compact Cassette.

23. A reset cassette as claimed in claim 20, characterised in that the reset cassette has external dimensions substantially equal to the external dimensions of one of a DCC tape cassette and a Compact Cassette.

24. A reset cassette as claimed in claim 19, characterised in that the reset cassette has external dimensions substantially equal to the external dimensions of one of a DCC tape cassette and a Compact Cassette.

25. A reset cassette as claimed in claim 18, characterised in that the electric circuit comprises a capacitor arranged electrically in parallel with the coil.

26. A reset cassette as claimed in claim 25, characterised in that a series resistor is interposed between the capacitor and the coil in the electric circuit.

27. A reset cassette as claimed in claim 26, characterised in that the reset cassette has external dimensions substantially equal to the external dimensions of one of a DCC tape cassette and a Compact Cassette.

28. A reset cassette as claimed in claim 18, characterised in that the reset cassette has external dimensions substantially equal to the external dimensions of one of a DCC type cassette and a Compact Cassette.

29. A reset cassette according to claim 18, wherein for cooperation with a magnetic tape cassette apparatus having a movable member movable into engagement with the reset cassette, said reset cassette includes: a switch opening in the housing for receiving said movable member and said switch is disposed adjacent said opening for being activated by said moveable member.

30. A reset cassette according to claim 29, wherein for cooperating with a magnetic tape cassette apparatus having a magnetic head pivotable between a first operating position and second operating position, pivoted through 180° relative to said first operating position, and a pair of moveable members each situated at a respective lateral side of said magnetic head and alternately moveable into a respective cassette engaging position corresponding to the first and second magnetic head operating positions, said cassette including:
two of said switch openings and two of said switches, and
control means, responsive to activation of a respective said switch, for feeding an electric current through said electric coil in either of two opposite directions for generating said non-alternating field with a direction corresponding to the activated switch and the operating position of the magnetic head.

31. A reset cassette according to claim 29, wherein for cooperating with a magnetic tape cassette apparatus having a magnetic head pivotable between a first operating position and second operating position, pivoted through 180° relative to said first operating position, and a pair of winding spindles which are alternately rotatable dependent on the magnetic head being in a respective one of the first and second operating positions, said reset cassette further comprises:
sensing means for sensing the rotation of the winding spindles in the magnetic tape cassette apparatus; and
control means for feeding an electric current through said electric coil in either of two opposite directions for generating said non-alternating field with a direction corresponding to the winding spindle for which rotation is sensed and the operating position of the magnetic head.

32. A reset cassette as claimed in claim 17, characterised in that the reset cassette has external dimensions substantially equal to the external dimensions of one of a DCC tape cassette and a Compact Cassette.

33. A reset cassette, comprising:
a housing having a pair of opposing main walls and transverse walls interconnecting said main walls, one of said transverse walls including a magnetic head opening and a switch opening spaced laterally of said magnetic head opening;
a switch within said housing positioned proximate said switch opening; and
electromagnetic means within said housing responsive to activation of said switch for generating a non-alternating electromagnetic field in said magnetic head opening directed from one of said main walls to the other of said main walls.

34. A reset cassette according to claim 33, further comprising a second of said switch openings in said one of said transverse walls, said second switch opening being spaced laterally of said magnetic head opening on the side opposite the other said switch opening, and a second switch within said housing proximate said second switch opening, said electromagnetic means being responsive to activation of said second switch to generate a non-alternating magnetic field in said magnetic head opening directed from said other of said main walls to said one of said main walls.

35. A reset cassette, comprising:
a housing having a pair of opposing main walls and transverse walls interconnecting said main walls, one of said transverse wall including a magnetic head opening;
a tape reel hub, for receiving a drive spindle of a magnetic tape cassette apparatus, rotatably disposed in said housing;
sensing means within said housing for sensing the rotation of the tape reel hub; and
electromagnetic means within said housing for generating a non-alternating electromagnetic field in said magnetic head opening directed from one of said main walls to the other of said main walls.

36. A reset cassette according to claim 35, further comprising a second of said tape reel hubs rotatably disposed in said housing, said sensing means being operable to sense the rotation of said second tape hub, and said electromagnetic means being operable to generate a non-alternating magnetic field directed from said other of said main walls to said one main wall in response to sensing means sensing rotation of said second tape reel hub.

* * * * *